(12) United States Patent
Nishimura et al.

(10) Patent No.: US 6,277,771 B1
(45) Date of Patent: Aug. 21, 2001

(54) REINFORCING CARBON FIBER MATERIAL, LAMINATE AND DETECTING METHOD

(75) Inventors: Akira Nishimura; Takashi Kobayashi; Ikuo Horibe, all of Ehime; Kiyoshi Homma, Shiga, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/402,981

(22) PCT Filed: Feb. 15, 1999

(86) PCT No.: PCT/JP99/00644

§ 371 Date: Oct. 14, 1999

§ 102(e) Date: Oct. 14, 1999

(87) PCT Pub. No.: WO99/42643

PCT Pub. Date: Aug. 26, 1999

(30) Foreign Application Priority Data

Feb. 18, 1998 (JP) .................................................. 10-036190
May 28, 1998 (JP) .................................................. 10-147218
Aug. 25, 1998 (JP) .................................................. 10-238264

(51) Int. Cl.[7] ................................ C08J 5/24; B32B 3/00
(52) U.S. Cl. .............................. 442/229; 73/760; 73/768; 324/71.1; 428/357; 428/364; 428/365; 428/408; 428/375; 428/379; 447/5; 447/6; 447/52; 447/199; 447/200; 447/229; 442/256
(58) Field of Search ................... 73/760, 768; 324/71.1; 428/357, 364, 365, 408, 375, 379; 442/6, 5, 52, 199, 200, 229, 256

Primary Examiner—Richard Weisberger
(74) Attorney, Agent, or Firm—Morrison & Foerster LLP

(57) ABSTRACT

A sheet-shaped carbon fiber base material is made up from reinforcing carbon fiber and metal wire integrally formed into a carbon fiber base material which may be a a woven fabric, a tow sheet and a prepreg. The volume fraction of metal in the sheet-shaped reinforcing carbon fiber base material is no more than 4% of the carbon fiber. A laminate may also be formed from the sheet-shaped carbon fiber material, where the reinforcing carbon fiber and the metal wire are laid-up in such a way that the metal wire insertion positions are mutually different. Also disclosed is a method of detecting the number of plies in a laminate that includes non-destructively sensing with a detector the presence of metal wire in a laminate of plies of a sheet-shaped carbon fiber base material made up of reinforcing carbon fiber and metal wire integrally formed to make the sheet-shaped carbon fiber laminate material and determining the number of the plies in the laminate based on the metal wires detected.

29 Claims, 7 Drawing Sheets

REINFORCING CARBON FIBER MATERIAL, LAMINATE AND DETECTING METHOD

TECHNICAL FIELD

The present invention relates to a reinforcing carbon fiber base material for obtaining FRP (fiber reinforced plastic) which is used as a structure or together with a structure; to a laminate thereof; to a method for detecting strain or deterioration arising in structures using same; and to a method for detecting the number of plies in the laminate.

TECHNICAL BACKGROUND

In recent years, the applications of FRPs have broadened and they have begun to be widely applied not just in the aerospace and sports fields but also to large-size structures in fields such as civil engineering and construction.

In particular, the use of FRPs in the repair or reinforcement of concrete structures is the subject of attention and is increasing for reasons such as the easing of vehicle weight restrictions, the occurrence of major earthquakes and the ease of use of such FRPs. Concrete structures include floor slabs, bridge piers, tunnels and buildings, but there occurs rusting of the internal reinforcements due to neutralization of the concrete and salt damage, and deterioration due to the alkali aggregate reaction, and these constitute problems for society. Again, when vibration due to passing traffic or due to earthquakes, and the pressure of earth and sand in the case of a tunnel, are also added, the cracks which occur in the concrete are widened and the progress of deterioration hastened. Moreover, since structures in the civil engineering and construction fields are often of a large size, it is not possible to predict rupture and there is the possibility of a major accident arising due to sudden failure.

Hence, a technique is demanded for observing the fatigue of structures and the progress of deterioration, and for predicting failure of a structure prior to the event. However, non-destructive inspection such as direct observation is mainly employed at present, and it is not easy to ascertain the state of fatigue or deterioration correctly.

Strain gauges have long been known as a means for detecting strain. However, since they detect strain within their own area and, moreover, since their length is short at no more than 30 mm, they can only detect local strain. Consequently, it is necessary to affix numerous strain gauges to detect strain widely in a large-size structure.

On the other hand, in Japanese Unexamined (Kokai) Patent Publication No. 60-114741, there is described a method in which carbon fiber filament yarn is arranged within an FRP member and the extent of damage to the carbon filaments from which the yarn is composed is measured from the change in the resistance of said yarn, and a lowering of the rigidity of the member or fatigue failure thereby detected beforehand. By means of this method, it is possible to detect strain in large-size structures over a broad area.

However, the numerous carbon fiber filaments from which the yarn is composed are present within the yarn in various states of alignment, and the aligned state thereof will differ between yarns. Hence, the extent of filament failure under an identical load will differ according to the particular yarn, and the reproducibility of changes in electrical resistance in these yarns is poor. Furthermore, with regard to the terminals at the two ends of the yarns where resistance measurement is required, it is necessary that there be contact with all the individual filaments, but it is difficult to effect contact with all the thousands or tens of thousands of filaments of diameter just a few microns within the yarn.

In Japanese Unexamined (Kokai) Patent Publication No. 2-38945, there is described a method for detecting fatigue failure in which a metal wire is arranged within a structure comprising a glass fiber reinforced composite material, and the change in electrical resistance thereof measured.

However, in the case where a metal wire is arranged within an FRP used for the repair/reinforcement of a large size structure, in particular a concrete structure, the surface of the structure is not restricted to being level and it is often curved or a surface with indentations/projections. Thus, in the fabrication of the FRP, the fiber reinforcing material is affixed running along the surface of the structure and resin impregnation performed at the same time. Consequently, the arrangement of the metal wire is a complex procedure which is carried out by hand on the reinforcing fiber base material while the resin remains uncured immediately after the impregnation. By such a method of arrangement, very often the metal wire is not arranged parallel to the reinforcing wire but meanders, so strain in the FRP which has been designed based on loads and strain in the reinforcing fiber direction is not accurately detected from said metal wire.

Now, in the carbon fiber reinforced plastics field, structures such as beams for aircraft or the like are produced by layup of numerous layers of sheet-shaped carbon fiber base material (for example prepreg wherein carbon fiber is arranged uniaxially in parallel and which has been impregnated with B-stage epoxy resin) such that the fiber is orientated in the desired direction, after which the resin is cured using an autoclave. However, the setting of the lamination direction and the number of plies of sheet-shaped carbon fiber base material in the laminate is carried out manually, so there is the possibility of mistakes being made. Hence, in the case of, for example, the beams which constitute the primary structural bodies of aircraft, samples are sometimes cut from the ends of the beam, the resin then burnt away and the lamination direction and the number of laminated plies in the remaining carbon fiber checked.

Moreover, in the case where repair or reinforcement of a concrete structure is carried out by affixing sheet-shaped carbon fiber base material to the structure, then impregnating with a cold-curing type epoxy resin and curing, the checking of the number of plies in the laminate of sheet-shaped base material is carried out for example by the method of taking photographs following the completion of the layup of each single layer, but this is extremely troublesome.

DISCLOSURE OF THE INVENTION

The objective of the present invention lies in obtaining a reinforcing carbon fiber base material which resolves the aforedescribed problems in the prior-art, and which can be fabricated to form FRPs of various shapes as large-size structures or integrally formed with large size structures and, moreover, which enables strain generated in the structures to be accurately detected and fatigue or deterioration of the structures to be predicted.

Another objective of the present invention lies in offering a laminate which resolves the aforedescribed problems in the prior art, and which makes it possible for the number of plies in a laminate comprising sheet-shaped carbon fiber base material to be detected simply and non-destructively, together with a detection method therefor.

The objectives of the present invention are realized by means of the following constructions.

A reinforcing carbon fiber base material which is characterized in that carbon fiber and metal wire integrally form a sheet-shaped carbon fiber base material, and the volume fraction of metal wire in terms of the carbon fiber is no more than 4%.

In the above, a reinforcing carbon fiber base material is preferred where said metal wire is metal wire covered around its outside with an insulating covering material.

In the above, a reinforcing carbon fiber base material is preferred where said metal wire is arranged in the same direction as the orientation direction of the carbon fiber.

In the above, a reinforcing carbon fiber base material is preferred where said metal wire is arranged at an angle in terms of the orientation direction of the carbon fiber.

In the above, a reinforcing carbon fiber base material is preferred where the aforesaid insulating covering material is a fibrous material.

In the above, a reinforcing carbon fiber base material is preferred where the covering ratio of the metal wire covered by the insulating covering material is at least 90%.

In the above, a reinforcing carbon fiber base material is preferred where the aforesaid sheet-shaped carbon fiber base material is a woven fabric.

In the above, a reinforcing carbon fiber base material is preferred where the aforesaid sheet-shaped carbon fiber base material is a tow sheet formed by sticking and securing unidirectionally parallely arranged carbon fiber to a support by means of an adhesive agent.

In the above, a reinforcing carbon fiber base material is preferred where the aforesaid sheet-shaped carbon fiber base material is a prepreg formed by combining carbon fiber and B-stage state thermosetting resin.

In the above, a reinforcing carbon fiber base material is preferred where the aforesaid sheet-shaped carbon fiber base material is a woven fabric formed by interweaving metal wire in the weft direction in a uniaxial woven fabric wherein carbon fiber is the warp.

In the above, a reinforcing carbon fiber base material is preferred where the aforesaid sheet-shaped carbon fiber base material has the metal wire inserted at essentially equal spacings.

In the above, a reinforcing carbon fiber base material is preferred where the aforesaid sheet-shaped carbon fiber base material is wound onto a paper cloth beam and the thickness of the metal wire is no more than the base material thickness.

In the above, a reinforcing carbon fiber base material is preferred where the metal wire is nichrome wire.

In the above, a reinforcing carbon fiber base material is preferred where the metal wire is iron wire or wire comprising an alloy thereof.

A laminate which is characterized in that sheet-shaped carbon fiber base material in which carbon fiber and metal wire together form the sheet-shaped carbon fiber base material and, furthermore, where the volume fraction of metal wire in terms of the carbon fiber is no more than 4%, is laid-up in such a way that the insertion position of the metal wire is mutually different.

In the above, a laminate is preferred where the aforesaid metal wire is arranged in the widthwise direction of the aforesaid sheet-shaped carbon fiber base material.

In the above, a laminate is preferred which is a fiber reinforced plastic comprising sheet-shaped carbon fiber base material impregnated with a matrix resin.

In the above, a laminate is preferred where the sheet-shaped carbon fiber base material is a woven fabric with metal wire interwoven in the weft direction in a uniaxial woven fabric in which carbon fiber is the warp.

In the above, a laminate is preferred where the sheet shaped carbon fiber base material is one in which metal wire has been inserted at auxiliary yarn uniform spacings.

In the above, a laminate is preferred where the metal wire is a ferromagnetic material.

In the above, a laminate is preferred where the metal wire is iron wire or wire comprising an alloy thereof.

In the above, a laminate is preferred where the metal wire is nichrome wire.

In the above, a laminate is preferred where the metal wire is metal wire covered around its outside with an insulating covering material.

A method for detecting the number of plies in a laminate which is characterized in that, in the above, the presence of metal wire in the aforesaid laminate is sensed by a non-destructive detection means, and the number of plies of sheet-shaped carbon fiber base material detected.

In the above, a method for detecting the number of plies in a laminate is preferred in which the aforesaid detection means is a metal detection method.

In the above, a method for detecting the number of plies in a laminate is preferred where the surface of a concrete structure is reinforced by an aforesaid laminate and the number of plies therein detected.

In the above, a method for detecting the number of plies in a laminate is preferred where the aforesaid detection means is an infrared camera and, by electromagnetic induction, the metal wire is made to generate heat and the regions of heat evolution are detected by means of the infrared camera.

In the above, a method for detecting the number of plies in a laminate is preferred where the aforesaid detection means is an infrared camera and, by passing current through the metal wire, the metal wire is made to generate heat and the regions of heat evolution are detected by means of the infrared camera.

A strain detection method for structures which is characterized in that, in the above, after producing an FRP from the reinforcing carbon fiber base material as a structure or together with a structure, strain generated in the structure is detected from the change in resistance of the aforesaid metal wire.

OPTIMUM MODE FOR PRACTISING THE INVENTION

Figure 1:
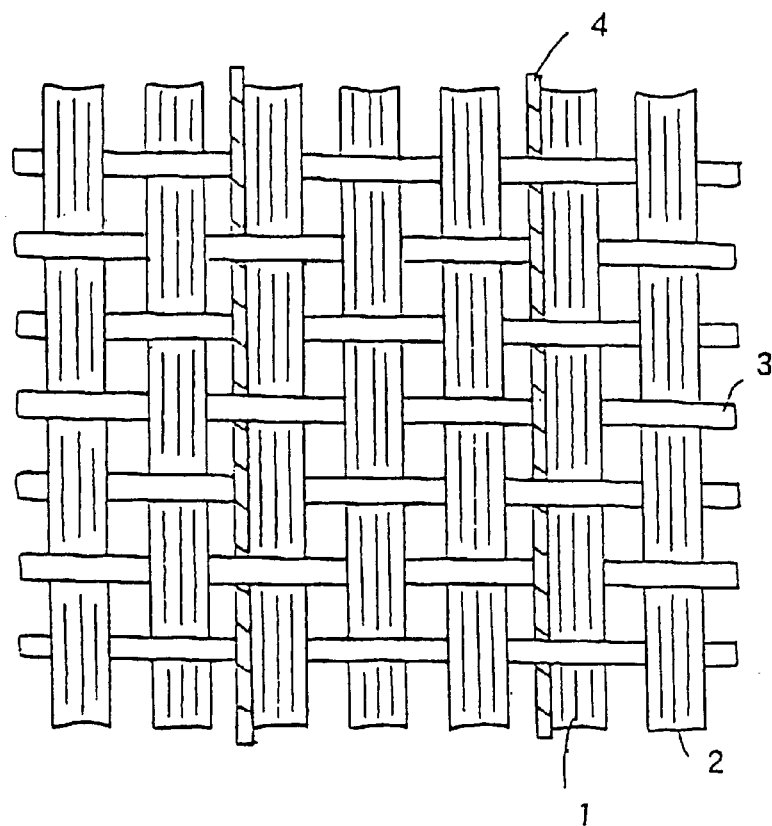
FIG. 1 is a drawing showing a uniaxial carbon fiber woven fabric relating to an embodiment of the present invention.

Hereinafter, the reinforcing sheet-shaped carbon fiber base material is referred to as the base material.

The metal wire used in the present invention comprises, for example, platinum, tungsten, molybdenum, silver, aluminium, nickel, magnesium, copper, steel, iron, or an alloy of these, Ni-Cr alloy (also known as nichrome alloy), Ni-Cr-Fe alloy, Fe-Cr-Al alloy or Fe-Cr-Al-Co alloy, of cross-sectional area in the range 0.002 to 0.2 $mm^2$, and it is a round, strip-shaped or flat-shaped linear material. These linear materials can be employed in the form of a single wire or they may be used in the form of a plurality of wires twisted together or the like. Of these, nichrome wire (a nichrome alloy) is preferred in that it has outstanding corrosion resistance, such as resistance to rusting, and there is a considerable change in its resistance with strain and so deformation can readily be confirmed.

Again, in the case where a detection method employing a magnetic field or electromagnetic induction is used, there should be employed a wire comprising a ferromagnetic substance such as iron, cobalt, nickel, terbium, gadolinium, osmium, erbium, or alloy of these, or chromium(IV) oxide ($CrO_2$), amongst which examples a metal wire comprising iron or alloy thereof is preferred in that it is cheap.

Now, the thickness of the metal wire in the case where it is covered is taken to be the value in the thinnest region, particularly in the case where the cross-section is strip- or flat-shaped.

Again, since the objective of the metal wire in the present invention is the detection of strain or the like, it is preferred that the volume fraction thereof in terms of the carbon fiber be no more than 4%. In the case of a metal wire covered around its outside with an insulating covering material, it is preferred that the volume of just the metal wire excluding the surrounding insulating covering material be no more than 4%.

The breaking elongation of the metal wire is greater than that of the carbon fiber but, when the carbon fiber ruptures, the metal fiber also ruptures at the same time. Consequently, even where the metal wire content is raised, there is little contribution to the reinforcing effect. Furthermore, the density of the metal wire is higher than that of the carbon fiber, so if considerable metal wire is arranged within the base material, the weight of the base material increases and, in particular in the case where the base material is used in applications to reinforce a concrete structure by sticking to the undersurface or side faces thereof, said base material will tend to sag and fall away, so this is undesirable.

Furthermore, if the region around the metal wire in the FRP is damp due to absorption of moisture from the surroundings in addition to the moisture already contained in the FRP, there is a fear that the metal wire will begin to corrode. Moreover, since the carbon fiber is electroconductive, there is a fear that the metal wire in an FRP will corrode just like a metal wire in the ground undergoes electrocorrosion, so this undesirable.

For such reasons, the proportion of the metal wire should be low, at no more than 4%, with no more than 2% further preferred.

If there is employed a base material of the present invention in which metal wire which has been covered with an insulating covering material is arranged as the metal wire, it is possible to satisfy the following two conditions demanded when said base material is used to produce an FRP and the detection of strain generated in the FRP is carried out by measuring the electrical resistance of the metal wire. Specifically, it is possible to ensure that there is insulation between the carbon fiber and the metal wire by means of the insulating covering material around the metal wire and, furthermore, it is possible to ensure that no slippage arises between the FRP and the metal wire.

As the insulating material, there should be employed an insulating covering material which has resin permeability (below this is referred to as a permeable covering material). In this way, the resin impregnated at the time of the fabrication of the FRP (hereinafter referred to as the matrix resin) passes into the covering material and reaches the metal wire surface, and since the matrix resin is also an insulating material, the metal wire exterior can be effectively insulated and covered thereby. Now, resin permeability here is the property of the resin to pass through the covering material, and permeation and impregnation have the same meaning.

Slippage of the metal wire can arise between the covering material and the FRP and also between the metal wire and the covering material but, because at the surface of the permeable covering material there is roughness present produced by both the covering material and the permeated matrix resin, it is possible thereby to suppress slippage between the covering material and the FRP. Again, since the permeable covering material is impregnated by the resin and stuck to the metal wire, it is possible to suppress slippage between the covering material and the metal wire.

A covering material comprising an open-cell plastic foam or a fibrous material is suitable as such a permeable covering material. In particular, if covering is carried out by winding a covering material comprising a fibrous material around the metal wire, resin impregnation occurs by the capillary phenomenon and reaches the metal wire surface, so this is still better.

If there is used a hard thermosetting resin such as an unsaturated polyester, vinyl ester, phenolic or epoxy as a permeable covering material comprising an open-cell plastic foam, it is easier to respond to distortions in the FRP and it is easier to transmit accurately the strains generated in the FRP to the metal wire, so this is preferred.

As examples of permeable covering materials comprising a fibrous material, there are nonwoven and woven tape-shaped materials, or filament yarn. With the metal wire as the core, covering can be carried out by winding these around the metal wire by a covering method, braiding method or wrapping method.

Examples of the fiber from which the covering material comprising a fibrous material is composed are polyester, nylon, glass, vinylon, polypropylene, aramid and other such fibers. Providing it is insulating, there are no particular restrictions but selection should be made taking into account the adhesion to the matrix resin. In the case where the matrix resin is an epoxy resin, nylon fiber is preferred.

The coating material comprising a fibrous material in the present invention may be provided while varying the number of windings or the pitch thereof, or the thickness of the yarn, but if the winding is carried out in only one direction then, after covering, non-linearity of the metal wire due to curling becomes more severe and more difficult to correct, and obstacles arise to the arrangement of the metal wire in the base material. Consequently, winding is carried out in both S and Z directions.

Again, if the filament yarn is too thin, then the number of windings required to secure the covering ratio is increased. Consequently, the thickness of the fiber from which the covering material is constructed should be about 20 to 500 denier. Moreover, with a multifilament yarn, the fibers loosen at the time of winding and spread out over the metal wire surface, so there is good covering efficiency, and therefore this is preferred. There may be two or more overlapping windings.

Now, when the covering is carried out by the coating of an insulating material, there is little surface roughness of the kind produced with a permeable covering material, and so there is a fear of slippage between the FRP and covering material.

Again, if there is used an uncovered metal wire, in the process of arranging the metal wire in the base material, or at the time of subsequent resin impregnation of the base material using a roller or the like, damage may be inflicted on the metal wire and there is a fear of this leading to abnormal variations in resistance following production of the FRP, or of severing of the metal wire occurring. Hence, where covering is conducted beforehand, this has the role of a protective layer, so it is possible to maintain the metal wire detection performance. For this reason too, it is preferred that the wire be covered when arranging in the base material.

The covering ratio of the metal wire in the aforesaid covering method is preferably 100%, but providing that it is at least 90% the insulation objectives can be realized.

That is to say, since the possibility of contact between the carbon fiber and metal wire is lowered by the impregnation of the insulating resin, providing the covering ratio is at least 90% then, following the resin impregnation there are practically no carbon fibers in contact with metal wire. However, at below 90%, even following the resin impregnation, there remain carbon fibers in contact with the metal wire and there is a fear that this will affect the resistance of the metal wire.

Now, the covering ratio of the metal wire is measured by the following method.

Firstly, using a microscope, a photograph is obtained of the surface prior to the resin impregnation. With the total area being taken as $S_1$, the surface area $S_2$ of metal wire which remains visible is measured, and the covering ratio is calculated by means of the formula given below. Measurements are made at 10 different locations on the covered metal wire, over a rectangular area expressed by the length (15 mm) in the orientation direction and the length in the thickness direction (total width), and the minimum value is taken as the covering ratio.

Covering ratio=$(S_1-S_2)/S_1 \times 100$ (%)

However, in the case where the covering is carried out by coating, the covering ratio may be measured using the following ultrasonic inspection method. That is to say, by a reflection method using pulse waves, the overall length $L_1$ of metal wire in the metal wire lengthwise direction, and the length $L_2$ observed just by metal wire surface reflection are measured, and the covering ratio calculated from the formula given below. Measurements are made at five different locations on the covered metal wire, over regions of length 50 mm, and the lowest is taken as the covering ratio.

Covering ratio =$(L_1-L_2)/L_1 \times 100$ (%)

The covering ratio is taken to be the same even where covering material has been superimposed at the same region. Thus, the covering ratio is defined as being at least 0% and up to 100%.

Alternatively, in order to realize the objective of insulation of the metal fiber in the aforesaid covering method, the number of locations where a sphere of diameter 10 $\mu$ or more may pass through in the areas where the metal wire is not covered with the aforesaid covering material should be no more than five per 10 cm in the metal wire lengthwise direction.

When the uncovered regions satisfy the condition that only a sphere of diameter less than 10 $\mu$ can pass through, penetration of the uncovered regions by the carbon fiber is difficult since the filament diameter of the carbon fiber is about this same value, and so it is possible in this way to ensure insulation between the carbon fiber and the metal wire.

In particular, in the case where the uncovered regions are of a long and narrow shape, if the orientation direction thereof is arranged in parallel with the carbon fiber, then penetration by the carbon fiber is facilitated. However, providing the aforesaid condition relating to a sphere passing through this region is satisfied, then penetration of the carbon fiber is prevented and insulation can be secured.

Again, since systematic covering takes place by a covering method based on winding using an aforesaid covering method, the covering ratio of the metal fiber surface as a whole is increased on average and local differences in the covering ratio are not very great. Hence, providing, amongst the uncovered regions, that the number of locations where a sphere of diameter 10 $\mu$ or more can pass through is no more than five per 10 cm in the lengthwise direction of the metal wire, then even though there may be small local unevenness in the covering ratio it can be concluded that insulation may be secured.

Now, the following method was employed as the method for measuring such locations.

Specifically, a number of circles was drawn inscribed within the uncovered regions on the photograph of the covered metal wire surface taken under a microscope by the same method as in the calculation of the covering ratio above, and the diameters of these circles was then measured, after which the maximum value was taken as the diameter of the sphere which can pass through. In such circumstances, the measurement positions can be arbitrarily selected but in order to suppress variations based on the measurement position, measurement was carried out over a continuous lengthwise direction distance of 10 cm from the selected position, and the number of times the diameter of the circles in this region exceeded 10 $\mu$m was recorded. Recording was carried out for five such freely selected regions and the number of locations where spheres of the maximum permitted value could pass through was determined.

In the present invention, reference to the fact of being integrally formed of carbon fiber and metal wire indicates that there is formed a state such that there is no positional slippage or separation between the carbon fiber and metal wire, and both may together produce a suitable woven/knitted material or both may be stuck together and fixed by a resin or adhesive agent. There are no particular restrictions thereon.

In the base material of the present invention, since the carbon fiber and the metal wire are integrally combined, when an FRP is produced, strain detection can be carried out accurately, but it is further preferred that the base material be fabricated into FRPs of various shapes along with a structure. Such a base material may be a tow sheet where unidirectionally parallely arranged carbon fiber yarns are affixed and secured to a support by means of an adhesive agent, or a prepreg in which carbon fiber yarns are integrally combined with a B-stage thermosetting resin, or a woven fabric.

Again, since the strain in the FRP is detected by means of embedded metal wire, the metal wire is not necessarily restricted to being arranged in the same direction as the direction of orientation of the carbon fiber, and it may also be arranged at an angle in terms of the orientation direction of the carbon fiber or metal wire may be arranged both in the same direction and at an angle thereto. In this way, strain detection in the direction of arrangement of the metal wire is possible.

Here, arranged in the same direction as the direction of orientation means that the angle of arrangement of the metal fiber is within ±15° in terms of the orientation of the carbon fiber, and when arranged at an angle in terms of the orientation direction means that the angle of arrangement of the metal wire is more than ±15° in terms of the orientation of the carbon fire. The arrangement direction should be determined by the required detection direction.

In particular, by orienting the metal wire essentially at right angles to the orientation direction of the carbon fiber, it is possible to detect strain at right angles to the orientation of the carbon fiber, so this is preferred.

Such base material has a sheet-shape so can be used to produce FRPs of various shapes along with structures.

Again, in the case of the aforesaid tow sheet or prepreg, the carbon fiber is fixed by means of adhesive agent or uncured resin respectively, so it is possible to arrange the metal fiber in parallel to the carbon fiber utilizing this.

Now, in the aforesaid tow sheet, the support and the adhesive agent are employed with the objective of securing the carbon fiber yarns. Consequently, the support may be, for example, a glass mesh or glass nonwoven fabric of suitable stiffness to which the metal wire can readily be stuck. Again, the adhesive agent may be of a curing or non-curing type. Taking into account compatibility with the matrix resin, in the case where the matrix resin is an epoxy resin, an epoxy resin adhesive should be used.

In a woven fabric, the mutual positions and shape are secured by the interlacing of the warp and weft yarns. Consequently, the metal wire can be arranged within the base material by interlacing with these yarns. In a woven fabric, the metal wire is fixed not by means of an adhesive as in the case of the aforesaid tow sheet or prepreg, but by interlacing, so there is no fear of separation. Consequently, a woven fabric is more preferred as the base material.

In the base material of the present invention, metal wire is preferably arranged in parallel at two or more locations within the base material. The base material of the present invention has a long shape, so if terminals are provided at the two ends of the metal wire the distance between the terminals is considerable and resistance measurement is difficult. However, if resistance measurement is carried out by arranging metal wires at two or more locations, with the metal wires connected together at one edge and with two terminals provided at the other edge, then measurement can be conducted easily.

Now, the manner of arranging the metal wires at two locations may be by arranging two different wires in parallel or one wire can be given a U-turn either part-way or at the edge of the base material.

Here, it is operationally preferred that, when two terminals are provided at one edge, the spacing between the group of wires (two wires, but one in the case where the wire is given a U-turn) to be given terminals be as small as possible. Consequently, the preferred spacing is no more than 5 cm. However, connection is possible between metal wires within the same base material or adjacent base materials may be connected, so there is no restriction to this range.

Again, where the distance between such a group of wires provided with terminals is low and the group arranged at a suitable spacing, detection of the occurrence of strain in an FRP is possible at more locations within the base material, so this is preferred. Moreover, where a plurality of base materials is laminated, the same kind of effect can be obtained where the location of arrangement of the metal wire in the base material is staggered by a chosen spacing.

The thickness of the base material of the present invention was measured using a thickness measurement instrument. The method was based on JIS R7602 "Testing Methods for Carbon Fiber Fabrics". That is to say, a 23.5 KPa load was applied for about 10 seconds until the thickness under the applied pressure had settled down, and then the thickness was measured using the thickness measurement instrument. This was carried out for 5 different locations on the base material and the average thereof taken. The thickness of the covered metal wire was measured by the same method.

Now, the base material thickness here was the value in regions where no metal wire had been arranged. In the practical examples described below, there was used as the thickness measurement instrument a Toyo Seiki Seisakusho (Co.) No. 132 model digital thickness measurement instrument B-2.

Since the base material of the present invention can also be applied to large-size structures, it should have a long shape which can be wound onto a paper cloth beam. Consequently, it is preferred that the base material can be wound onto a paper cloth beam even though metal wire has been arranged in the base material.

Thus, where the base material is wound onto a paper cloth beam, providing that the thickness of the metal wire in this base material, and in the covered wire case, provided that the thickness of the metal wire including the covering material, is no more than the thickness of the base material, then the base material surface will be smooth when unwound from the paper cloth beam. However, if the thickness of the covered metal wire is greater than the thickness of the base material, then since the base material is wound onto the paper cloth beam in a state in which the winding pressure is concentrated on the covered metal wire, when the base material is unwound from the paper cloth beam wavy protrusions/depressions are generated in the surface of the base material due to the variations in the length of the carbon fiber yarns, which is undesirable.

Practical embodiments of specific woven fabrics employing carbon fiber of the present invention are now explained with reference to the drawings.

FIG. 1 shows the case where, in a so-called uniaxial woven fabric in which multifilament carbon fiber yarns 2 comprising carbon fiber single filaments 1 are arranged in parallel in the warp direction, and weft direction auxiliary yarns (auxiliary weft) 3 are interlaced with the carbon fiber yarns, the covered metal wire 4 is arranged in parallel with the carbon fiber yarns 2 between adjacent carbon fiber yarns.

Figure 2:
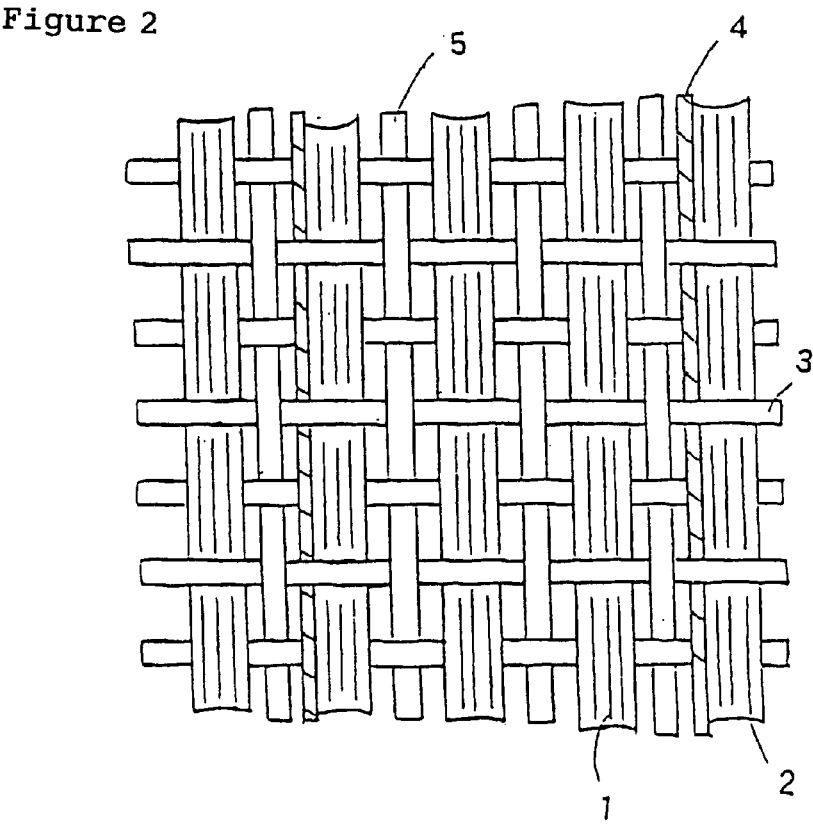
FIG. 2 is a drawing showing a non-crimped uniaxial carbon fiber woven fabric relating to an embodiment of the present invention.
Figure 3:
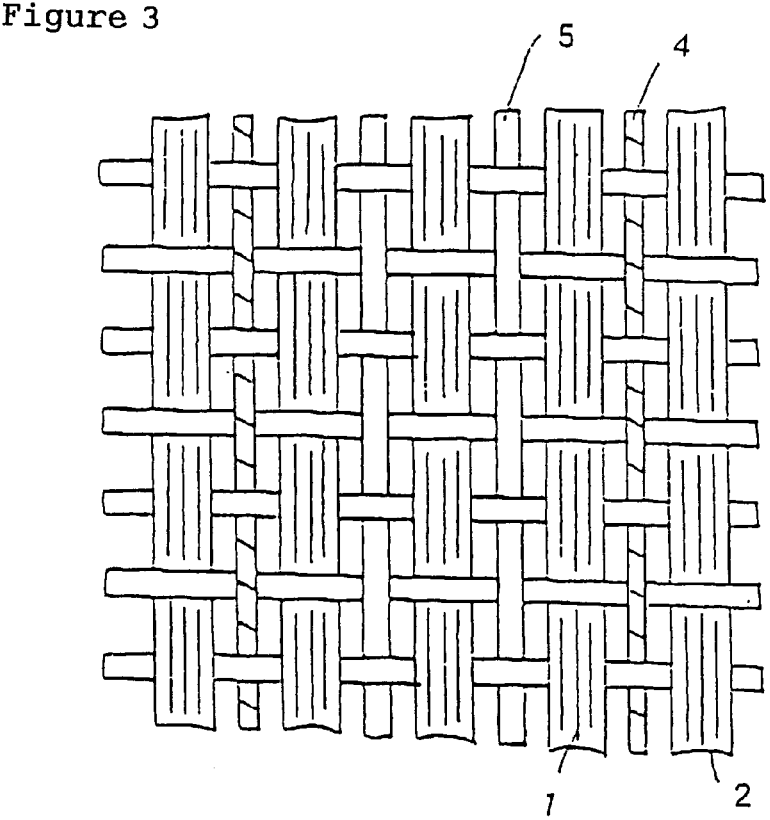
FIG. 3 is a drawing showing a practical embodiment of a non-crimped uniaxial carbon fiber woven fabric relating to an embodiment of the present invention where metal wire has been used as warp direction auxiliary fiber.

Again, FIG. 2 and FIG. 3 show cases where, in a so-called uniaxial non-crimped woven fabric in which auxiliary yarns (auxiliary warp) 5 are also arranged in the warp direction and are interlaced with the weft direction auxiliary yarns and, furthermore, the warp direction carbon fiber yarns are substantially free of crookedness (crimp), covered metal wire 4 is arranged in parallel to carbon fiber yarns 2 between adjacent such carbon fiber yarns 2 in the same way as in FIG. 1. In particular, FIG. 3 shows the case where the covered metal wire 4 is arranged replacing auxiliary warp 5.

Even in the case of a biaxial woven fabric in which weft carbon fiber yarns 6 and warp carbon fiber yarns 2 are interlaced, the covered metal wire 4 can be arranged within the base material by arranging along with the warp carbon fiber yarns 2. Now, as weaving methods, besides these there can be employed a plain weave, satin weave or twill weave, etc.

Again, the woven fabric can also be a so-called biaxial non-crimped woven fabric where warp direction and weft direction auxiliary yarns are alternately arranged in terms of warp direction and weft direction carbon fiber yarns, forming a woven structure integrally connected by means of the auxiliary yarns, and substantially without the warp direction and weft direction carbon fiber yarns having any crookedness (crimp).

Figure 5:
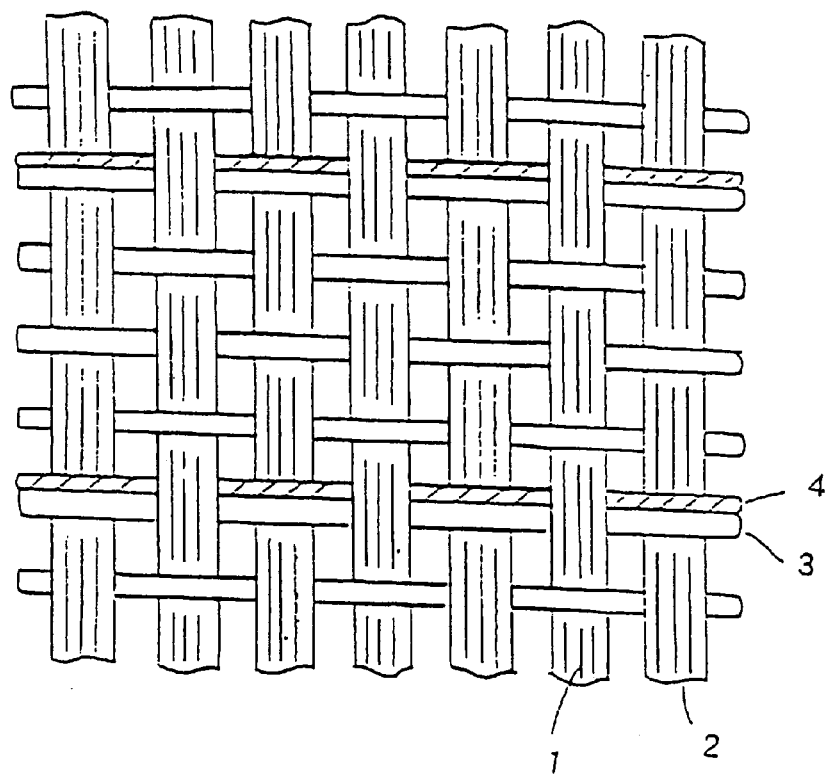
FIG. 5 is a drawing showing a carbon fiber woven fabric relating to an embodiment of the present invention in which metal wire is arranged at an angle to the reinforcing fiber.

FIG. 5 shows an example of the case where, in a uniaxial woven fabric, metal wire is arranged at an angle in terms of the direction of orientation of the carbon fiber. Here, this is a case where metal wire 4 is integrally formed with a part of weft auxiliary yarn (glass fiber) 3, and is arranged in parallel with the weft auxiliary yarn, but the arrangement locations of the metal wire need not necessarily be integrally formed with weft auxiliary yarn and may comprise metal wire on its own.

Again, with regard to the method of arranging the metal wire within the woven fabric, this may be at the time of the construction of the woven fabric, with the metal wire threaded along with the warp or warp auxiliary yarn, or with the weft or weft auxiliary yarn. Alternatively, the metal wire may be inserted on its own.

In FIGS. 1 to 5, the covering of the metal wire was carried out by winding 70 denier multifilament, comprising a bunch of 52 nylon filaments, at 1200 times/metre in both the S and Z directions, and the covering ratio was 100%.

Figure 4:
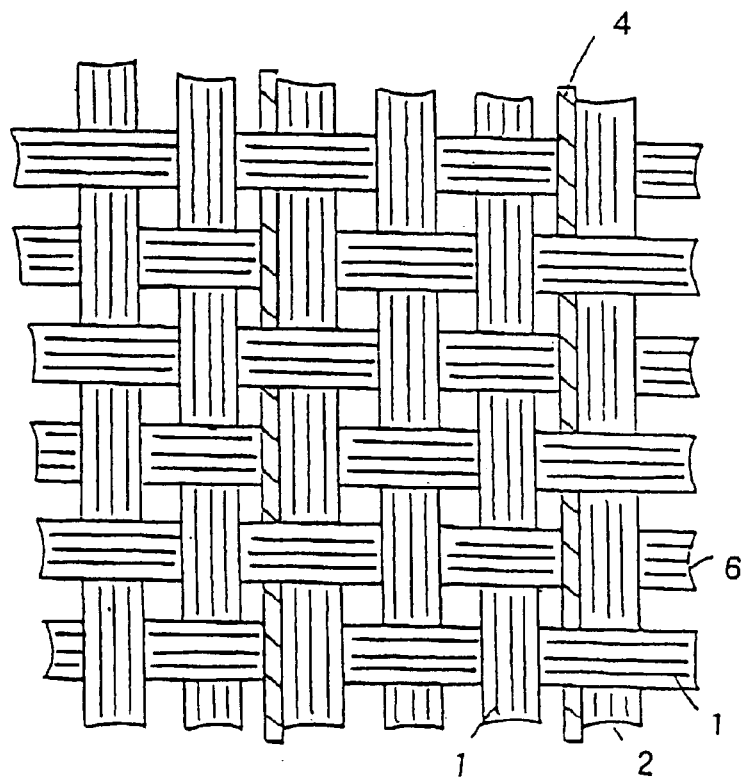
FIG. 4 is a drawing showing a biaxial carbon fiber woven fabric relating to an embodiment of the present invention.

Now, if the covered metal wire is closely affixed to a yarn and arranged between adjacent carbon fiber yarns as in FIGS. 1, 2 and 4, the metal wire is fixed in position by yarn and yarn, or by yarn and auxiliary yarn, so the metal fiber is readily arranged in parallel with the yarn. Furthermore, if so-called filling is carried out, whereby the warp and weft are fixed with an adhesive agent, the metal wire and the yarns can be secured even more firmly in parallel.

As examples of the adhesive agent employed for such filling, there are nylon copolymer, polyester copolymer, polyethylene or other such low melting polymer.

In applications to repair or reinforce concrete structures, there should be used carbon fiber of outstanding alkali resistance, of tensile strength 3000 to 5600 MPa and tensile modulus of elasticity 220 to 640 GPa. In particular, if there is used high strength, high modulus, carbon fiber of tensile strength 4300 to 5600 MPa and tensile modulus of elasticity 340 to 640 GPa, the required number of plies of base material is reduced and there is a considerable saving of labour, so this is preferred.

Now, the carbon fiber yarns from which the base material is constructed preferably comprise 6000 to 24000 filaments and, in particular in a woven fabric state, the yarns may constructed by combining together in a bunch a number of such carbon fiber yarns.

The carbon fiber weight per unit area in the base material employed in the present invention is preferably in the range 180–1000 g/m². At less than 180 g/m², while being favourable in terms of ease of resin impregnation, the number of plies of base material required for reinforcement has to be increased, so there is the nuisance of more impregnation operations. Moreover, since the base material thickness is small, the thickness of the covered metal wire readily exceeds the base material thickness, and when the base material is wound onto and unwound from the paper cloth beam, there is considerable production of wavy projections/indentations. On the other hand, if the weight per unit area exceeds 1000 g/m², then while this may be efficient in that the number of plies of base material required is less, resin impregnation into the centre in the thickness direction of the base material becomes difficult.

A more preferred range for the weight per unit area of the carbon fiber is 200–400 g/m². When in the range 200–400 g/m², although the resin impregnation operation may be a little rough, the resin applied to the base material impregnates the carbon fiber by the capillary phenomenon before cold-curing takes place, so the prescribed mechanical characteristics are obtained.

In the present invention, in the case of a uniaxial woven fabric as shown in FIGS. 1, 2, 3 and 5, the weft auxiliary yarn in the woven fabric forms the woven structure with the metal wire arranged in the same direction with the warp, so fiber of high stiffness is desired for the weft auxiliary yarn. By using fiber of high stiffness, the warp and weft auxiliary yarn are more firmly held together by the increased force applied to the weft auxiliary yarn by the warp and, when used to produce an FRP, accurate detection of the strain in the FRP from the metal wire is facilitated.

Preferred examples of the fiber with high stiffness are glass fiber, aramid fiber and carbon fiber, amongst which cheap glass fiber is more preferred. In particular, using weft auxiliary yarn of denier 100–6,000 facilitates the fixing of the metal wire. Now, the fiber thickness ratio in the warp and weft directions, that is to say the value expressed by (thickness of the carbon fiber yarn in the warp direction)/(thickness of the weft auxiliary yarn) is preferably from 3 to 100.

Where this thickness ratio is less than 3, the weft auxiliary yarn is too thick, so crimp is produced in the warp direction carbon fiber yarn, and the strength characteristics of the carbon fiber are not fully displayed.

On the other hand, if the ratio exceeds 100, the weft auxiliary yarn is too thin, and there is a reduced effect in terms of fixing the warp direction carbon fiber and metal wire.

Now, in the case where a warp auxiliary yarn is used, having the same stiffness as that of the weft auxiliary yarn provides the shape of the woven fabric with stability, so again glass fiber is preferably employed.

When cracks have been generated in a structure due to fatigue or the like and a lowering of rigidity occurs, the structure shows considerable strain in terms of an identical stress. Consequently, if the change in the resistance of the metal wire in the FRP is measured, it is possible to detect the state of strain or fatigue in the FRP structure or in a concrete structure to which the FRP has been integrally applied.

For example, in the case where a concrete structure is reinforced by integral application of a CFRP (carbon fiber reinforced plastic), first of all the concrete surface is degreased and any surface unevenness repaired, after which a primer is applied to improve the adhesion with the concrete and this then left to dry. Next, a cold cure type epoxy resin, which constitutes the matrix resin, is coated onto the face of the concrete and to this is stuck the carbon fiber base material. Then, the base material is thoroughly impregnated with resin using a roller or trowel. At this time, the end regions of the metal wire should first be connected to lead wires using a solderless terminal or the like.

Further resin is then coated on top and resin impregnation carried out in the same way with a roller or trowel. The CFRP can be produced by repeating this operation and affixing the specified number of plies of base material and then curing the resin.

Detection of the state of strain in the structure may be performed by connecting the two ends of the aforesaid lead wires to a tester and measuring the electrical resistance, but in order to detect small changes in resistance accurately measurement by the following method should be performed.

Specifically, by connecting a bridge circuit and dynamic strain gauge, the change in resistance of the metal wire can be read off as a strain. Where required, recording can be carried out on an XY recorder, or the like. In this way, it is possible to detect the state of strain over a long period.

As the matrix resin used here, there can be employed a thermosetting resin such as an epoxy, vinyl ester, unsaturated polyester or phenolic resin but in cases where fire resistance is required a phenolic resin is preferred, while in cases where it is to be used on a concrete structure an epoxy resin which has outstanding adhesive strength and alkali resistance is preferred.

The laminate of the present invention is characterized in that base material in which metal wire has been inserted is laid-up in such a way that the metal wire insertion position is mutually different. Furthermore, the method of the present invention for detecting the number of plies in a laminate comprises a method characterized in that the presence of the metal wire in the aforesaid laminate is sensed non-destructively by a detection means and the number of layers of sheet material thereby detected.

As examples of the detection means which can be used here, there are the following.

Method A; a method in which the detection means is a metal detection method, and detection is performed by the disruption of a magnetic field when the metal wire passes through the magnetic field, Method B; a method in which the detection means is an infrared camera, and heat is generated in the metal wire by electromagnetic induction and the region of such heat generation is detected by means of an infrared radiation thermometer, Method C; a method in which the detection means is an infrared camera, and heat is generated by passage of current through the electric wire and the region of such heat generation is detected by means of an infrared radiation thermometer.

Figure 9:
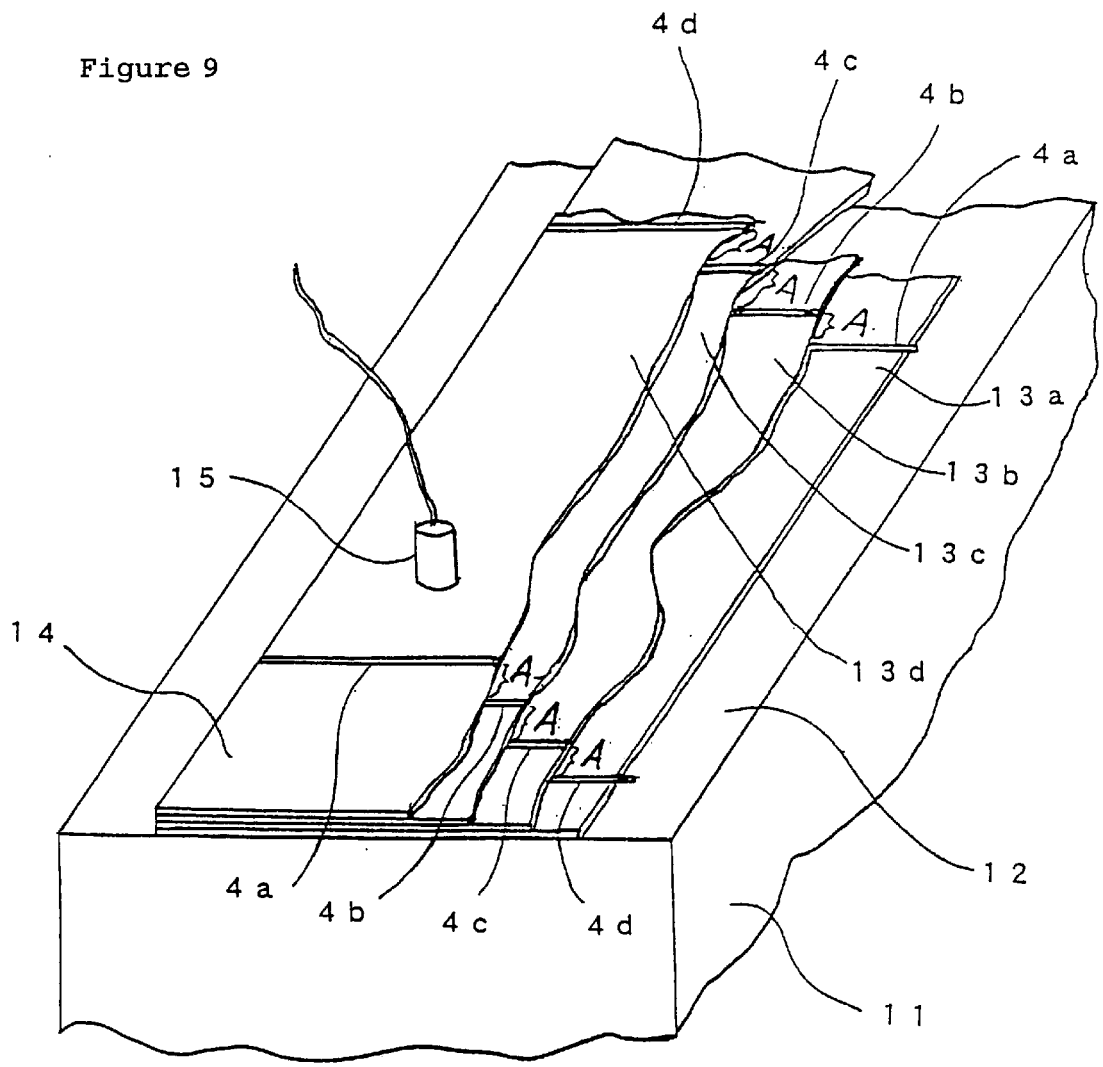
FIG. 9 is a drawing explaining the mode of detecting the arrangement of metal wire in a laminate and the number of plies, in relation to an embodiment of the present invention.

Based on FIG. 9, explanation is now provided of the case in which a concrete structure is repaired or reinforced with base material in which carbon fiber has been uniaxially arranged, as an example of the laminate and of the method of the present invention for detecting the number of plies.

Firstly, after coating a cold-curing type resin such as an epoxy resin on the surface 12 of a concrete structure 11 to which primer has been applied, one layer of base material 13a in which metal wire 4a has previously been inserted in the base material widthwise direction is affixed in the lengthwise direction of the concrete structure in such a way that the direction of the carbon fiber matches the lengthwise direction of the structure. After coating further epoxy resin on top, the base material is impregnated with the resin by application of an impregnating roller. Next, a second base material layer 13b is laid on top in such a way that the carbon fiber direction is the same as in 13a and also such that the metal wire 4b is staggered at a spacing A from metal wire 4a, with metal wire 4a and metal wire 4b being mutually parallel, after which resin coating and impregnation are carried out in the same way as in the case of the first layer. Layup of the specified number of plies of the base material is carried out by repeating the same procedure with the insertion position of the metal wire being staggered by the spacing A in each case. By curing of the resin at ambient temperature there is obtained the FRP laminate 14 which reinforces the concrete structure.

The details of the detection method will be explained later, but it is possible to detect the number of plies of base material non-destructively by determining the number of insertion positions of the metal wire embedded in the FRP, by setting or moving above the FRP the sensor 15 of a detection means which detects the presence of metal wire. Now, if the number of metal wires contained within one period, that is to say within the spacing of the metal wires arranged within a single base material, is taken as the number of plies, it is possible to determine the number of plies simply and without error.

In the laminate of the present invention, the spacing A of the stagger provided between the insertion positions of the metal wire at the time of layup is preferably in the range 2 to 10 cm. Again, the spacing of the metal wires 4a, 4b, 4a . . . in the first layer, second layer, third layer . . . is preferably about the same as this. Since the sensing of the position of the metal wires in the FRP is carried out from the FRP thickness direction, if the metal wires are arranged at a spacing of less than 2 cm then, while it will depend on the sensitivity of the particular detection means, it may be difficult to distinguish between the metal wires in each layer, so this is undesirable. On the other hand, if the spacing between the wires exceeds 10 cm, then when the number of plies is large the distance between metal wires from the 1st layer up to the nth layer increases at 10 x (n-1) cm, becoming extremely large, so the detection of the number of plies becomes troublesome. Where the distance is from 2 to 10 cm, distinguishing between a plurality of metal wires is possible and, furthermore, sensing can be carried out accurately and easily.

Now, in the case where a plurality of metal wires has been inserted at a single insertion position, the aforesaid spacing A between metal wires denotes the distance between an identical such metal wire at the metal wire insertion position in each layer.

Furthermore, in the laminate of the present invention, the spacing B in the arrangement of the metal wires within the same base material should be set to be as small as possible taking into account the detection efficiency. It will differ according to the number of plies to be detected, but should comprise essentially equal spacings within the range 3 to 100 cm. If the arranged spacing between wires is less than 3 cm, then the stagger between the wires in the first and second layers becomes very small or overlap occurs, and so distinguishing the insertion positions becomes difficult. Hence, this is undesirable. Again, if it exceeds 100 cm, while the number of plies which can be detected increases, the length of the period is raised, so the detection operation becomes troublesome.

Again, in the case of a uniaxial woven fabric as shown in FIGS. 1, 2, 3 and 5, the arrangement direction of the metal wire in terms of the warp carbon fiber may be in the warp direction as shown in FIGS. 1, 2 and 3, or it may be in the weft direction as shown in FIG. 5. Now, since it is necessary to perform the layup while staggering the position of the metal wire in order to detect the number of plies after forming the FRP, if the metal wire is arranged in the warp direction then there has to be prepared numerous types of woven fabric with the metal wire inserted at different positions. This is time-consuming in terms of fabric production and lot control. On the other hand, if the metal wire is arranged in the widthwise direction, then a single type of woven fabric can be cut in such a way that the metal wire insertion position is staggered by the specified spacing. Such woven fabric can be produced automatically by means of a dobby operation. Thus, production and lot control are not time-consuming, and so this Is desirable.

Again, where the metal wire is arranged at essentially a uniform spacing within the same base material, the length of one period will be the same whatever the position, thereby making it possible to detect the number of plies accurately. Hence, this is preferred.

Figure 10:
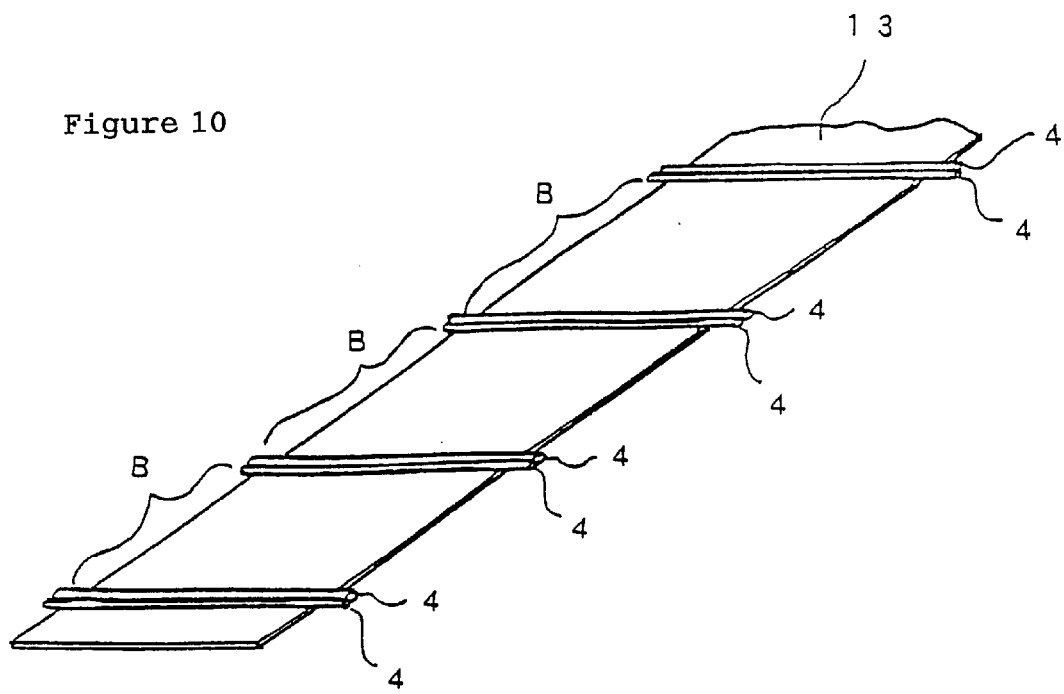
FIG. 10 is a drawing explaining the state, in relation to an embodiment of the present invention, in which metal wires arranged in the weft direction of the base material have been inserted, two at a time, at a spacing B in terms of the lengthwise direction of the material.

Now, in the case where a plurality of metal wires Is inserted at a single metal wire insertion position, the spacing B of the arrangement of said metal wires within the same base material, as shown in FIG. 10, denotes the separation between the same such metal wire at the respective metal insertion positions.

In FIG. 9, as a preferred embodiment, explanation has been given of an example where the arrangement direction of the metal wire in the base material lies In the widthwise direction thereof but the arrangement may also be in the lengthwise direction of the base material.

Furthermore, with regard to the base material lamination direction, it is possible to carry out unidirectional lamination only at 0°, which is the lengthwise direction of the laminate; bidirectional lamination at 0 and 90°, which are the lengthwise and widthwise directions; and multidirectional lamination in which the direction $\pm\alpha$ is also added thereto, etc.

In particular, base material in which the carbon fiber is arranged uniaxially in the lengthwise direction is outstanding in its mechanical properties such as tensile strength and tensile elastic modulus in the direction of arrangement of the carbon fiber (0°), but the mechanical properties fall markedly as one moves away from this direction and approaches 90°. The lamination direction is an important factor in that it governs to a considerable extent the mechanical properties of the FRP. Consequently, accurately ascertaining not only the number of plies in an FRP but also the lamination direction is important for guaranteeing the reliability of a structure comprising an FRP.

Using a flat wire can be suggested as a means for preventing the insertion location of the metal wire from bulging outwards and for facilitating metal detection. In particular, this is preferred In the case of aforesaid method A, where a metal detection method is employed as the detection means, and sensing is carried out by the disruption of the magnetic field when the metal wire passes through a magnetic field. Such flat metal wire may comprise metal wire where the metal portion is itself of flat shape or where a number of metal wires are integrally joined together by the covering material so that, overall, a flat shape is formed. However, taking into consideration ease of production, etc, the case where a number of metal wires or a number of covered metal wires are grouped to form an overall flat shape is preferred.

As said flat shape, the total cross-sectional area of the metal wire is preferably from 0.002 to 0.2 $mm^2$, with the width of the flat shape preferably being no more than 5 mm and the height of the flat shape being from 10 to 100% of the base material thickness. If the width is more than 5 mm, or if the height is less than 10% of the thickness of the base material, metal wire detection can no longer normally be carried out, so this is undesirable. If the height is more than 100% of the base material thickness then there is the problem of bulging at the metal insertion positions, and so this is undesirable. Now, the base material thickness is the value measured in accordance with JIS R7602 "Testing Methods for Carbon Fiber Fabrics".

In the case where a flat wire is formed using a plurality of metal wires or a plurality of covered metal wires, then from 2 to 4 should be inserted in parallel to the base material.

Thus, in the present invention, not necessarily just one metal wire but also a number thereof may be together inserted at a single insertion position.

Next, the detection methods in the present invention are explained. As shown in FIG. 9, detection of the number of plies of base material can be performed non-destructively by setting or passing detection means 15, which detects the presence of metal wire, above the laminate of the present invention and determining the number of metal wires embedded in the FRP.

Figure 11:
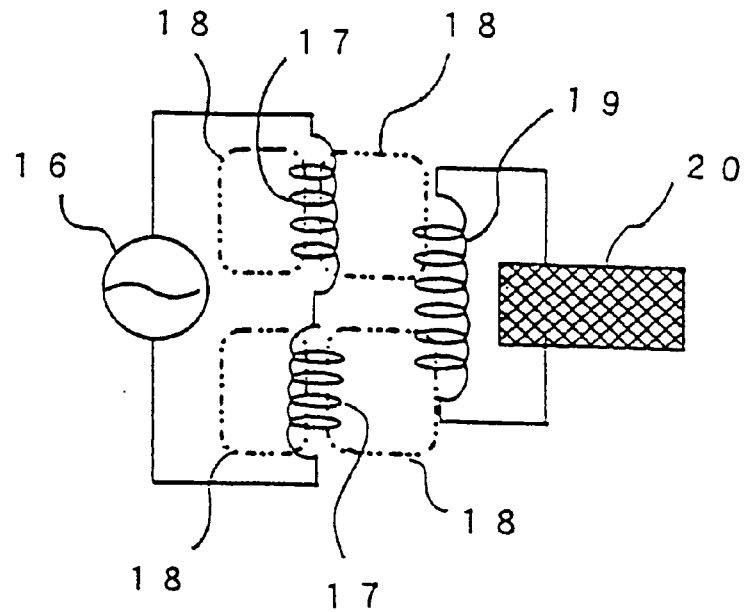
FIG. 11 is a drawing explaining the principles of metal wire sensing relating to an embodiment of the present invention, and it is a drawing explaining the fact that the magnetic field is in an equilibrium state.
Figure 12:
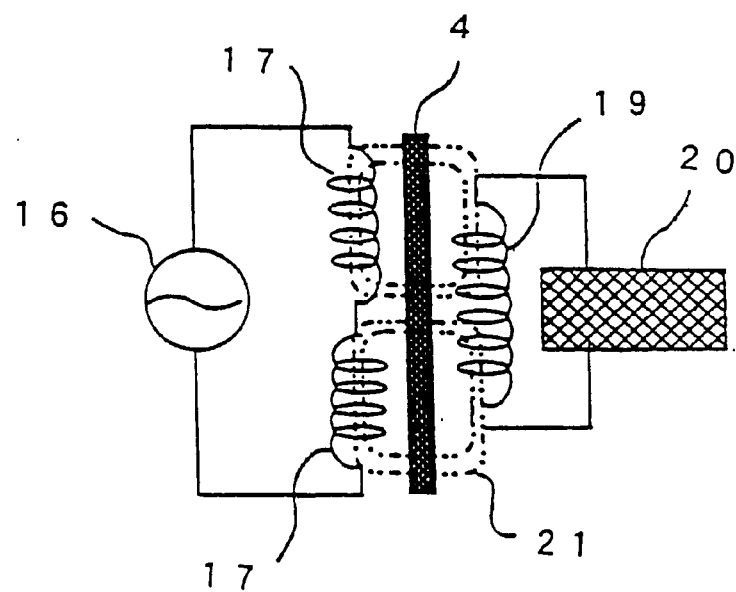
FIG. 12 is a drawing explaining the principles of metal wire sensing relating to an embodiment of the present invention, and it is a drawing explaining the fact that, by introduction of the metal wire into a magnetic field, the magnetic field has a non-equilibrium state.

FIG. 11 and FIG. 12 are schematic diagrams explaining an example of the principles of the detection means using method A. When the metal wire 4 of a laminate is introduced as shown in FIG. 12 while forming an equilibrium primary magnetic field 18 by means of oscillator 16 and excitation coil 17 as shown in FIG. 11, the steady state alternating-current magnetic field is disrupted and an induced current flows in metal wire 4. By means of this induced current, a secondary magnetic field 21 is generated around the metal wire and the equilibrium magnetic field is disrupted. By this disturbance, a minute voltage is induced in receiving coil 19 and this voltage is detected by detector 20. Thus, it is possible to sense the presence of the metal wire.

Examples of the detection means employed in this method are a metal detector and a contactless switch. These devices are small and light, so are easy to handle and hence can even be employed in locations where detection is difficult such as high places or narrow regions, etc.

Now, in the case of an FRP laminate produced from uniaxial prepreg or woven fabric base material comprising carbon fiber, since the carbon fiber is electro-conductive, due to the entangled state of said carbon fiber, when the metal detector or contactless sensor approaches the laminate, even where metal wire is not present an eddy current may flow in the base material and this eddy current cause a magnetic field to be produced, activating the receiver coil and producing a faulty reading. In such cases, it is possible to prevent these faulty readings by employing a metal detector or contactless switch with a small operating range, that is to say within the range of the magnetic field formed by the oscillator and excitation coil. The operating range of this metal detector or contactless switch is preferably from 10 to 40 mm. If it is less than 10 mm then it is necessary either to increase the thickness of the metal wire required to be detected by the metal detector or contactless switch, or to use a plurality of metal wires at a single location.

Consequently, the laminate will bulge at the locations where the metal wire has been inserted, and the amount of the foreign-matter metal wire inserted is increased so that the mechanical characteristics, etc, may be lowered. Alternatively, if it exceeds 40 mm then, depending on the shape of the base material, there may be a faulty reading by the metal detector or contactless switch.

With regard to the detection of the number of plies of base material, the detection device is placed on the FRP surface and, while moving it in the direction perpendicular to the direction of arrangement of the metal wire over a distance identical to the arrangement spacing of the metal wire in the base material, the number of times metal wire is sensed by the detector over this length is counted and this count gives the number of plies. Again, the output from the detection device can be introduced into a recorder and the detection result recorded.

Explanation is now provided of method B, where the detection means is an infrared camera, and heat is generated in the metal wire by electromagnetic induction and the region of such heat evolution detected by means of an infrared radiation thermometer. In this method, when the metal wire of the laminate is introduced into the magnetic field generated by a current passing through the coil of an induction heating device, an eddy current flows in the metal wire and Joule heat is generated in the magnetic wire by this eddy current, so that heat is evolved by the metal wire. This region of heat evolution, or the region of the FRP of locally raised temperature, is detected by the infrared radiation thermometer, and so it is possible to determine the position of the metal wire. Now, with the elapse of time, the heat will diffuse through the laminate and the temperature of the metal wire will fall, so it is desirable that a detection operation based on an infrared radiation thermometer be carried out rapidly before the temperature falls.

In this method, when observation is carried out using the infrared radiation thermometer, the region of heat evolution appears as a line, and from the total number of regions of such heat evolution lying within one period of the arranged metal wire in the base material, it is possible to detect the number of plies.

Explanation is now provided of method C, where the detection means is an infrared camera, and heat is generated in the metal wire by passage of current and the region of such heat generation detected by means of an infrared radiation thermometer. In this method, terminals are connected to the ends of the metal wire and, by passing current, the metal wire is made to generate heat. The region of heat evolution, or the region of FRP of locally raised temperature, can be sensed by an infrared radiation thermometer and the metal wire detected. However, since it is necessary to connect together the electric wires in the many layers, operation is slightly troublesome.

The infrared radiation thermometer which is the detection means in method B and method C detects the infrared radiant energy which is self-radiated from the subject of measurement, and is finally expressed as a colour or black and white thermal image by means of a camera. Examples are a thermo-tracer, infrared thermograph or infrared camera, etc.

Now, since it is possible to detect the metal wire in the form of a line in method B and method C, it is also possible detect easily the lamination direction as well as the number of plies.

The method of the present invention for detecting the number of plies is preferably employed in the case of FRP structures where numerous layers of base material are laid-up, impregnated with resin and cured, and where non-destructive inspection in the moulded product is difficult, such as aircraft parts, car parts, hulls of boats, windmill sails, FRP reinforcements for concrete structures, vehicle parts, construction components and the like.

In particular, confirmation of the number of plies in the FRP reinforcements for concrete structures has only be possible hitherto by, for example, taking photographs at the completion of each layup operation, so there is great merit in using the method of the present invention for detecting the number of plies.

Below, examples are provided of the base material of the present invention for detecting the strain produced in FRPs in the form of the change in resistance of metal wire, together with examples of the use thereof and the mode of detection.

(EXAMPLE 1)

As the metal wire, there was used nichrome wire of round cross-section, with a bare wire diameter of 0.1 mm and a resistivity of 141.3 $\Omega$/m, and this was subjected to prior degreasing by washing with acetone. The nichrome wire was covered by winding with 70 denier multifilament comprising 52 nylon filaments, at 1200 times/meter in both the S and Z directions. The covering ratio was as shown in Table 1. Furthermore, the number of locations in those regions of the metal wire uncovered by the insulating covering material through which a sphere of diameter at least $10\mu$ could pass was no more than one per 10 cm in the lengthwise direction of the metal wire.

As the base material, there was used a uniaxial carbon fiber woven fabric formed by arranging PAN-based high strength carbon fiber yarn of properties as shown in Table 1 (number of single filaments: 24,000; 14,400 denier) in the lengthwise direction, and arranging glass fiber as the auxiliary yarn in the widthwise direction, and also with the covered nichrome wire arranged in parallel to the aforesaid carbon fiber to produce the structure shown in FIG. 2. 50 meters of this woven fabric was produced and rolled up while winding on a paper cloth beam. Subsequently, this woven fabric was unwound from the paper cloth beam and a check made as to whether or not there were wavy indentations/protrusions. The result is shown in Table 2.

The production of a CFRP was carried out by impregnating the woven fabric, which had been cut to length 300 mm and width 250 mm, with a cold-curing epoxy resin using a roller. At this time, the practical characteristics such as the ease of impregnation and the handling properties of the base material were evaluated. Curing was carried out by leaving for 10 days at a room temperature of 23° C.

Figure 6:
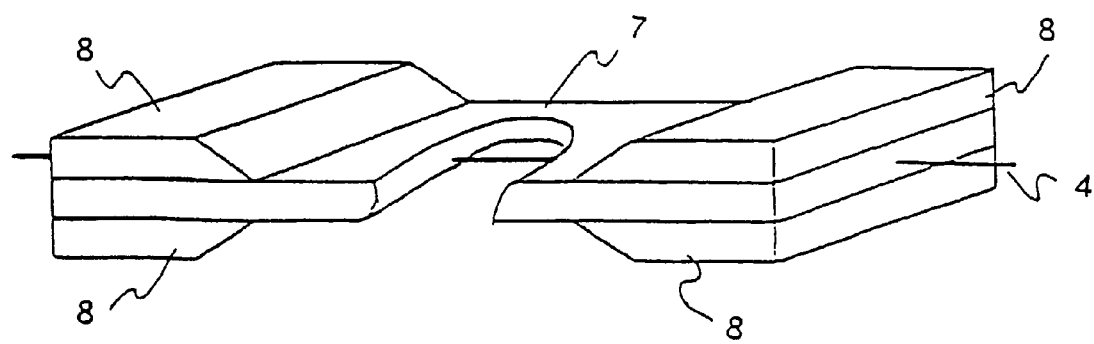
FIG. 6 is a perspective view of a test piece for measuring the change in electrical resistance of nichrome wire.

The change in the electrical resistance of the nichrome wire was measured when tensile strain was applied to the CFRP. After sticking glass tabs 8 to the CFRP 7 produced above, a test piece was prepared by cutting out in the shape shown in FIG. 6. To both end regions of the nichrome wire 4, lead wires were connected by solder via solderless terminals.

There was no observed divergence in angle between the straight line connecting the cross-sections of the nichrome wire at the two end faces in the orientation direction of the test piece, and the direction of the carbon fiber. Furthermore, when the matrix resin of the test piece was burnt away in an electric over, the nichrome wire extracted and the length thereof measured, it was found that the length of the actual nichrome wire matched the test piece length. In other words, the nichrome wire had been arranged in parallel with the carbon fiber.

Figure 7:
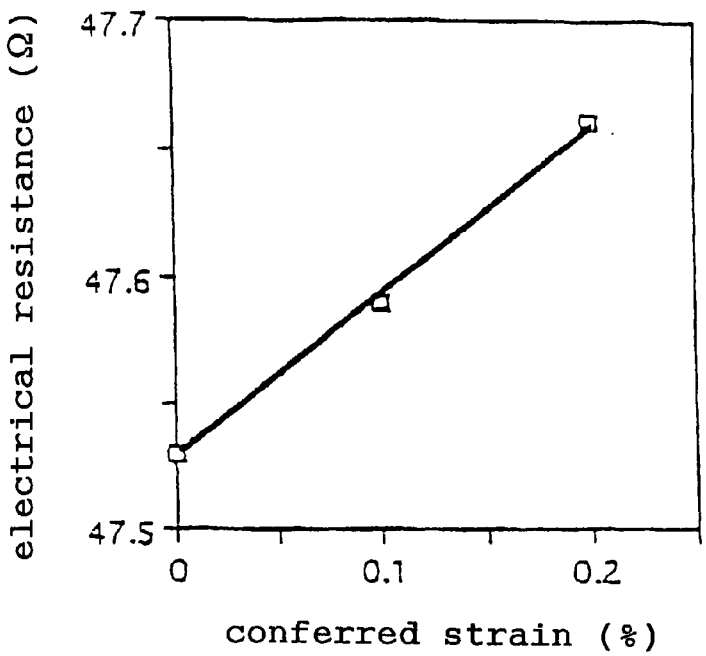
FIG. 7 is a graph showing the relation between electrical resistance and strain prior to fatigue.

The electrical resistance was measured with a Wheatstone bridge. The measurement was carried out three times, when the fiber lengthwise direction tensile strain was 0, 0.1% and 0.2%. A strain of 0.2% is the value of strain at which the iron reinforcements in concrete yield. Now, the strain was confirmed by means of a Kyowa Electronic Instruments Co. strain gauge (KFG-20-120-C1-11). The strain was applied at a rate of 1 mm/min in an atmosphere at 23° C. The results are shown in Table 2 and FIG. 7.

Figure 8:
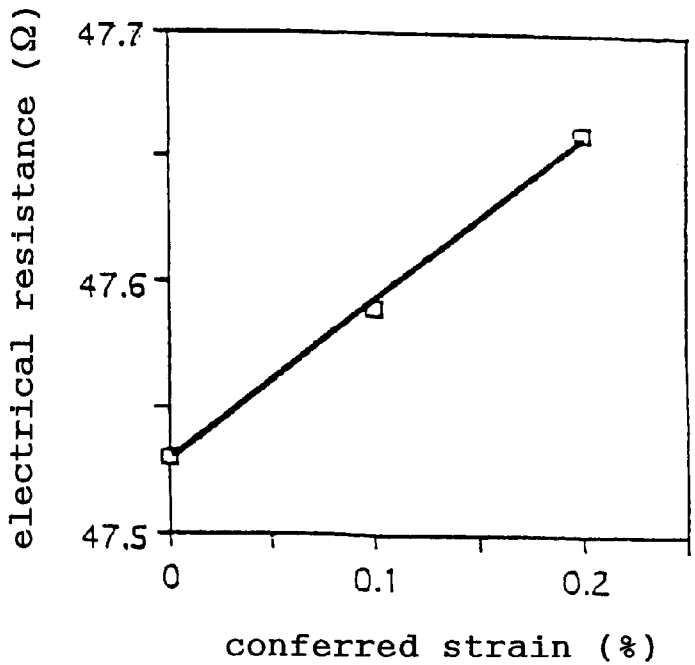
FIG. 8 is a graph showing the relation between electrical resistance and strain following fatigue.

Furthermore, tensile-tensile fatigue testing was carried out at strains of 0.1 to 0.2%. The number of repetitions of the fatigue test was $10^6$ times. Following the fatigue test, the relation between tensile strain and electrical resistance was measured and the results are shown in Table 2 and FIG. 8.

No difference in the graphs of strain against electrical resistance was observed before and after the fatigue testing, and in each case by applying a 0.2% strain the electrical resistance rose 0.13 Ω. Measurements were repeated 10 times in each case, but the reproducibility was good and the same percentage rise in electrical resistance was obtained. This level of increase was small, being about 0.3% when compared to the electrical resistance value of the nichrome wire itself, but the reproducibility was excellent and the electrical resistance value was not affected by fatigue. In other words, it was clear that it was possible to detect the value of strain by measuring the electrical resistance.

In addition, as one of the properties of the CFRP, the tensile strength in the carbon fiber direction was measured. Measurement was based on JIS K 7073, and was carried out at a rate of extension of 1 mm/min in a 23° C. atmosphere. The strength was taken as the value of the breaking load divided by the CF cross-sectional area at right angles to the CF arranged in direction of extension in the CFRP, and an average of five measurements was taken.

The tensile strength of the CFRP in this example was 4450 MPa. On the other hand, in the case of an identical CFRP excepting that no nichrome wire was introduced, although there was a scatter in the results since the production method was hand layup and since there was a variation in strength between the yarns, the tensile strength was 4500 MPa±10%. Thus, the tensile strength of the CFRP in this example was within the range of normal divergence, when compared to the case when no nichrome wire was introduced, and so it was clear that there was no lowering of properties.

(EXAMPLE 2)

Excepting that there was employed the woven fabric shown in FIG. 5 in which the arrangement direction of the metal wire was in the weft direction, the production of a CFRP and the evaluation thereof were carried out in the same way as in Example 1. The results are shown in Table 2.

With regard to the arrangement of the metal wire in the widthwise direction here, this was carried out by insertion along with some of the glass fiber when introducing the weft glass fiber at the time of the construction of the woven fabric.

No difference in the graphs of strain against electrical resistance was noted before and after the fatigue testing, and by applying 0.2% strain the resistance was increased by 0.12 Ω.

When the arrangement direction of the nichrome wire within the test piece was determined in the same way as in Example 1, since it was interwoven in the form of weft, no meandering or the like was observed.

(COMPARATIVE EXAMPLE 1)

The production of a CFRP and the evaluation thereof were carried out in the same way as in Example 1 excepting that, as the woven fabric, two pieces were produced identical to that in Example 1 excepting that no nichrome wire was interwoven and, instead, the nichrome wire was arranged by hand between these two pieces. The results are shown in Table 2.

The CFRP production was carried out by impregnating the woven fabric with the aforesaid resin and then arranging on top, by hand, the covered nichrome wire in parallel to the carbon fiber, after which another layer of woven fabric was placed on top and resin impregnation performed.

When the angle between the arrangement direction of the nichrome wire within the test piece and the carbon fiber direction was determined in the same way as in Example 1, a discrepancy was noted. Moreover, the length of the nichrome wire recovered from the test piece was longer than the length of the test piece. In other words, the nichrome wire had not been arranged in parallel to the carbon fiber.

No difference was observed between the graphs of strain against electrical resistance before and after the fatigue testing, but the increase in electrical resistance in terms of a 0.2% strain was 0.07 Ω.

In this comparative example, since the nichrome wire had not been arranged in parallel to the carbon fiber, the percentage increase in electrical resistance in terms of the strain was small and it was clear that it was not suitable for detection of strain.

(COMPARATIVE EXAMPLE 2)

The production of a CFRP and the evaluation thereof were carried out in the same way as in Example 1 using the same covered nichrome wire as in Example 1 except that the volume fraction of nichrome wire in the base material was made 10%. The results are shown in Table 2.

No difference was noted between the graphs of strain against electrical resistance before and after the fatigue testing, and the increase in electrical resistance due to the application of 0.2% strain was 0.13 Ω.

However, the tensile strength was reduced by about 12% compared to Example 1. It was clear that, in this comparative example, the volume fraction of the nichrome wire was too high so a reduction in properties was brought about.

(COMPARATIVE EXAMPLE 3)

The production of a CFRP and the evaluation thereof were carried out in the same way as in Example 2 excepting that no nichrome wire was interwoven and, instead, the nichrome wire was arranged by hand between two layers of woven fabric. The results are shown in Table 2.

The production of the CFRP was carried out by impregnating the woven fabric with resin and then arranging on top by hand the covered nichrome wire in parallel to the carbon fiber, after which another layer of woven fabric was placed on top and resin impregnation performed.

When the relation between the arrangement direction of the nichrome wire inside the test piece and the weft in the woven fabric was determined in the same way as in Example 2, a discrepancy was noted and meandering of the nichrome wire was observed.

No difference was noted between the graphs of strain against electrical resistance before and after the fatigue testing, but the increase in electrical resistance in terms of a 0.2% strain was 0.06 Ω.

In this comparative example, since the nichrome wire had not been arranged parallel to the weft direction in the woven fabric, which was the direction of measurement of strain in the FRP, the percentage increase in electrical resistance in terms of the strain was small and it was clear that this was not suitable for detection of the strain.

TABLE 1

Base Material and Nichrome Wire Specifications

| Item | Example 1 | Example 2 | Comp. Ex. 1 | Comp. Ex. 2 | Comp. Ex. 3 |
|---|---|---|---|---|---|
| base material | | | | | |
| lengthwise reinforcing fiber | carbon fiber | | | | |
| tensile strength | 4900 MPa | | | | |
| tensile elastic modulus | 230 GPa | | | | |
| weft yarn | glass fiber | | | | |
| weight per unit of reinforcing fiber (g/m$^2$) | 300 | | | | |
| thickness (mm) | 0.35 | | | | |
| nichrome wire | | | | | |
| covering method | winding of nylon multifilament | | | | |
| covering ratio (%) | 100 | | | 100 | |
| volume fraction (%) | 2 | | | 10 | 2 |
| thickness of covering material (mm) | 0.25 | | | | 0.25 |
| arrangement method | beforehand in the base material | | by hand at time of layup | beforehand in base material | by hand at time of layup |

Below, explanation is provided, by means of practical examples, of the laminate of the present invention and the method of detecting the number of plies in the case where a concrete structure has been repaired or reinforced.

(EXAMPLE 3)

As the metal wire, there was employed iron wire of diameter 0.11 mm, and by covering this wire by winding 75 denier, 36 filament, multifilament polyester yarn in the S direction and then 100 denier low-melting nylon yarn in the Z direction at 1000 turns per metre, there was prepared insulation-covered iron wire of covering ratio 100%.

Next, PAN-based high strength carbon fiber (number of filaments: 24,000; 14,400 denier; tensile strength 4900 MPa, tensile elastic modulus 230 GPa) was arranged at a density of 1.88 yarns per cm in the lengthwise direction, and in the widthwise direction there was introduced as auxiliary yarn, at a density of 3 yarns per cm, covered yarn produced by covering 405 denier glass fiber with 50 denier low-melting nylon yarn. At a 50 cm spacing, instead of two picks of the auxiliary yarn there was arranged the aforesaid covered iron wires two-together, so that a total of four iron wires was inserted. Next, by heating with a heater, the low-melting nylon yarn used for insulation covering of the iron wire and the low-melting nylon yarn of the weft auxiliary yarn were melted and adhesion to the warp carbon fiber effected. In this way, there was produced a uniaxial carbon fiber woven fabric of width 25 cm, in which iron wire had been introduced at a spacing of 50 cm, that is to say at an arrangement period of 50 cm, and which had been filled and where the weight per unit area of carbon fiber was 300 g/m$^2$.

Then, in preparation for layup, four pieces of the woven fabric were cut such that the position of the metal wire was staggered by 5 cm when the widthwise directions of the woven fabric were lined up.

Next, a cold-curing epoxy resin was coated onto the concrete surface of bridge piers which had already been coated with primer and left 24 hours, and then the first layer of woven fabric was stuck in the bridge pier circumferential direction, after which further epoxy resin was coated on top of the woven fabric and the resin made to impregnate the woven fabric using an impregnation roller. Subsequently, the second layer of woven fabric was affixed around the cir-

TABLE 2

Practical Results

| Item Evaluated | Example 1 | Example 2 | Comparative Example 1 | Comparative Example 2 | Comparative Example 3 |
|---|---|---|---|---|---|
| Occurrence of waviness when unwound after winding base material on paper cloth beam | None | None | — | None | — |
| Practical characteristics | good | good | bad | good | bad |
| Length of test piece (cm) | 33.6 | — | 33.3 | 33.6 | — |
| Width of test piece (cm) | 2.5 | — | 2.5 | 2.5 | — |
| Actual length of nichrome wire (cm) | 33.6 | — | 33.7 | 33.6 | — |
| Conduction between CF and nichrome wire | No | No | No | No | No |
| Nichrome wire parallel to warp or weft | Yes | Yes | No | Yes | No |
| Electrical Resistance Value (Ω) | | | | | |
| Before Fatigue | | | | | |
| when strain 0% [a] | 47.53 | 47.55 | 47.59 | 47.55 | 47.56 |
| when strain 0.2% [b] | 47.66 | 47.67 | 47.66 | 47.68 | 47.61 |
| extent of increase [b–a] | 0.13 | 0.12 | 0.07 | 0.13 | 0.06 |
| After Fatigue | | | | | |
| when strain 0% [c] | 47.53 | 47.55 | 47.60 | 47.56 | 47.57 |
| when strain 0.2% [d] | 47.66 | 47.67 | 47.66 | 47.68 | 47.65 |
| extent of increase [c–d] | 0.13 | 0.12 | 0.06 | 0.12 | 0.08 |
| Tensile strength of CFRP (MPa) | 4450 | — | 4460 | 3960 | — |
| Lowering of properties of CFRP | No | — | No | Yes | — | cumference of the bridge pier with the widthwise directions of the layers lined-up and the resin applied in the same way as for the first layer. Thereafter, impregnation of the woven fabric was performed using the impregnation roller. In the same way, layup, application of the resin and impregnation of the resin was carried out for the third and fourth layers, and cold curing effected, so that the concrete surface was reinforced with a laminate, that is to say with an FRP of carbon fiber woven fabric.

As the metal detector employed for the detection of the metal wire, there was used a contactless switch of sensor outer diameter 30 mm. A lamp on this device illuminated on sensing metal, and the device was placed on the surface of the laminate. Next, the contactless switch was moved in the direction perpendicular to the metal wire lengthwise direction at a speed of 2 m/min, and then brought to a halt when it had moved 50 cm. When the number of times the lamp illuminated over this distance was measured, it was four times, confirming that the number of plies was four. The number of plies was found to be the same when the procedure was carried out in other regions of the laminate, and it was clear that detection was possible at any position.

The carbon fiber was black and the laminate was also black, so it was not possible to observe the presence of the metal wire from outside. However, with a contactless switch it was possible to detect the number of plies non-destructively.

(EXAMPLE 4)

Using an identical laminate to that in Example 4, the electric wires were heated for 1 minute using a 100 V, 1400 W electromagnetic induction device, after which this electromagnetic induction device was removed and measurement performed with an infrared radiation thermometer set at a distance of 1 m from the laminate. Now, as the infrared radiation thermometer there was used one with a HgCdTe detector, having a minimum detectable temperature difference at 30° C. of 0.08° C. and of measurement range –50 to 2000° C.

When the temperature distribution was displayed as a colour thermal image, four regions of high temperature were observed of long thin shape running in the bridge pier lengthwise direction and it was possible to detect the fact that the number of plies was four.

(EXAMPLE 5)

Excepting that there was used, as the metal wire, a nichrome single strand wire of bare wire diameter 0.2 mm, a laminate was produced under the same conditions as in Example 3, and then terminals and lead wires connected to the ends of the four nichrome wires. In this example, heating was carried out by passing current through the metal wire, but the method of detecting the metal wire was the same as in Example 4.

Passage of current was carried out from an AC source via a sliding transformer. The four metal wires were connected in parallel and a voltage of 5 V was applied overall.

When the temperature distribution was displayed as a colour thermal image, a total of four locations of high temperature were observed of long thin shape running in the bridge pier lengthwise direction and it was possible to detect the fact that the number of plies was four.

Industrial Utilization Potential

In the interior of the reinforcing carbon fiber base material of the present invention, metal wire is arranged and the volume fraction of the metal wire is made no more than 4% of the reinforcing fiber, so it is possible to fabricate said reinforcing carbon fiber into FRPs of various shapes, as large-size structures or integrally formed therewith and, furthermore, it is possible to detect the state of strain generated in the structure or FRP accurately.

With regard to the laminate and detection method of the present invention, since metal wire is arranged in the interior of the reinforcing carbon fiber base material at a volume fraction of no more than 4% and, furthermore, since said base material is laid-up in such a way that the insertion positions of the metal wire are mutually different, it is possible to detect simply and non-destructively the number of plies and the lamination direction in the laminate, which cannot be done by normal non-destructive inspection methods.

The reinforcing carbon fiber base material, laminate and detection method of the present invention are preferably employed for FRP structures, and in particular in the repair or reinforcement of concrete structures.

What is claimed is:

1. A sheet-shaped carbon fiber base material, comprising reinforcing carbon fiber and metal wire integrally formed into a carbon fiber base material selected from the group consisting of a woven fabric, a tow sheet and a prepreg, the volume fraction of metal in said sheet-shaped reinforcing carbon fiber base material being no more than 4% in terms of the carbon fiber.

2. The carbon fiber base material according to claim 1 where the metal wire is metal wire which has been covered around its outside with an insulating covering material.

3. The carbon fiber base material according to claim 1 where the metal wire is arranged in the same direction as the direction of orientation of the carbon fiber.

4. The carbon fiber base material according to claim 1 where the metal wire is arranged at an angle in terms of the direction of orientation of the carbon fiber.

5. The carbon fiber base material according to claim 1 where the insulating covering material is a fibrous material.

6. The carbon fiber base material according to claim 5 where the covering ratio of the metal wire covered by the insulating covering material is at least 90%.

7. The carbon fiber base material according to claim 1 where the sheet-shaped carbon fiber base material is a woven fabric.

8. The carbon fiber base material according to claim 1 where the sheet-shaped carbon fiber base material is a tow sheet formed by sticking to a support carbon fiber unidirectionally arranged in parallel, by means of an adhesive agent.

9. The carbon fiber base material according to claim 1 where the sheet-shaped carbon fiber base material is a prepreg integrally formed from carbon fiber and B-stage thermosetting resin.

10. The carbon fiber base material according to claim 7 where the sheet-shaped carbon fiber base material is a woven fabric produced by interweaving metal wire in the weft arrangement direction in a uniaxial woven fabric in which carbon fiber constitutes the warp.

11. The carbon fiber base material according to claim 1 where the said sheet-shaped carbon fiber base material is formed by inserting the metal wire at essentially equal spacings.

12. The carbon fiber base material according to claim 1 where the sheet-shaped carbon fiber base material is wound onto a paper cloth beam and the thickness of the metal wire is not more than the thickness of the base material.

13. The carbon fiber base material according to claim 1 where the metal wire is nichrome wire.

14. The carbon fiber base material according to claim 1 wherein the metal wire is iron wire or wire comprising an alloy thereof.

15. A laminate comprising a sheet-shaped carbon fiber material comprising reinforcing carbon fiber and metal wire integrally formed into said sheet-shaped carbon fiber base material, said sheet-shaped carbon fiber base material being selected from the group consisting of a woven fabric, a tow sheet and a prepreg, where the volume fraction of metal in said sheet-shaped reinforcing carbon fiber base material being no more than 4% in terms of the carbon fiber, and said reinforcing carbon fiber and said metal wire are laid-up in such a way that the metal wire insertion positions are mutually different.

16. A laminate according to claim 15 where the metal wire is arranged in the widthwise direction of the sheet-shaped carbon fiber base material.

17. A laminate according to claim 15 which is a fiber reinforced plastic formed by impregnating the sheet-shaped carbon fiber base material with matrix resin.

18. A laminate according to claim 15 where the sheet-shaped carbon fiber base material is a woven fabric formed by interweaving metal wire in the weft arrangement direction in a uniaxial woven fabric in which carbon fiber constitutes the warp.

19. A laminate according to claim 15 where the sheet-shaped carbon fiber base material is formed by inserting metal wire at essentially equal spacings.

20. A laminate according to claim 15 where the metal wire is a ferromagnetic substance.

21. A laminate according to claim 20 where the metal wire is iron wire or a wire comprising an alloy thereof.

22. A laminate according to claim 15 where the metal wire is nichrome wire.

23. A laminate according to claim 14 where the metal wire is a metal wire covered around the outside with an insulating covering material.

24. A method of detecting the number of plies in a laminate, comprising non-destructively sensing with a detector the presence of metal wire in a laminate of plies of a sheet-shaped carbon fiber base material comprising reinforcing carbon fiber and metal wire integrally formed into said sheet-shaped carbon fiber laminate material and determining the number of the plies in the laminate of the sheet-shaped carbon fiber base material based on the metal wires detected.

25. A method of detecting the number of plies in a laminate according to claim 24, wherein the sensing is carried out by a metal detector.

26. A method of detecting the number of plies in a laminate according to claim 24 where the surface of a concrete structure has been reinforced with the laminate and the number of plies therein is detected.

27. A method of detecting the number of plies in a laminate according to claim 24 where the detector is an infrared camera, the metal wire is made to generate heat by electromagnetic induction, and regions of heat generation detected with the infrared camera.

28. A method of detecting the number of plies in a laminate according to claim 24 where the detector is an infrared camera, the metal wire is made to generate heat by the passage of current through said metal wire, and regions of heat generation detected with the infrared camera.

29. A strain detection method for structures comprising a fiber reinforced plastic material formed from a reinforcing carbon fiber base material comprising reinforcing carbon fiber and metal wire integrally formed into said fiber reinforced plastic material, said method comprising detecting an amount of strain arising in the structure based on a change in resistance of the metal wire.

* * * * *